United States Patent [19]

Christensen et al.

[11] Patent Number: 5,454,625
[45] Date of Patent: Oct. 3, 1995

[54] ICE CART

[75] Inventors: Mark Z. Christensen, Aurora; Ralph E. Williams, Littleton, both of Colo.

[73] Assignee: Kloppenburg & Co., Englewood, Colo.

[21] Appl. No.: 229,361

[22] Filed: Apr. 18, 1994

[51] Int. Cl.[6] ................................................. B60P 01/34
[52] U.S. Cl. ........................... 298/18; 298/11; 187/259; 187/272; 187/244; 414/495
[58] Field of Search ................... 298/11, 18, 2; 187/269, 272, 275, 244, 243; 414/419, 421, 495

[56] References Cited

U.S. PATENT DOCUMENTS

| 603,676 | 5/1898 | Clark . | |
|---|---|---|---|
| 2,001,008 | 5/1935 | Aubey . | |
| 2,483,894 | 10/1949 | Feibel | 187/269 |
| 2,727,641 | 12/1955 | Tomkins | 414/421 |
| 2,903,219 | 9/1959 | Ingham, Jr. . | |
| 3,587,892 | 6/1971 | Vernette | 187/244 |
| 3,685,674 | 8/1972 | Bruer et al. . | |
| 3,756,442 | 9/1973 | Wagenblast et al. . | |
| 3,863,985 | 2/1975 | Zuber . | |
| 4,084,706 | 4/1978 | Russell | 414/421 |
| 4,561,822 | 12/1985 | Schmook . | |
| 4,802,709 | 2/1979 | Jones . | |
| 4,802,810 | 2/1989 | Gunn . | |
| 5,193,649 | 3/1993 | Lee | 187/244 |

Primary Examiner—Michael S. Huppert
Assistant Examiner—Gregory A. Morse
Attorney, Agent, or Firm—Dorr, Carson, Sloan & Birney

[57] ABSTRACT

A portable ice cart provides both elevation adjustment and tilt adjustment for the ice hopper. The ice cart includes a support frame that allows the ice hopper to be tilted to any of a plurality of orientations about a horizontal axis, and a scissors linkage for supporting the support frame at an adjustable elevation above the base of the cart. A retractable spring-loaded pin is used to lock the ice hopper in place after the desired orientation has been reached. The elevation of the ice hopper can be raised by pumping a foot pedal that pressurizes a hydraulic cylinder and extends the scissors linkage.

10 Claims, 7 Drawing Sheets 5,454,625

ICE CART

BACKGROUND OF THE INVENTION

1. Field of the Invention

The present invention relates generally to the field of carts for transporting ice. More specifically, the present invention discloses a portable ice cart having a hopper that can be easily elevated to a desired height and then tilted to a desired angle to permit ice to be conveniently removed from the hopper.

2. Statement of the Problem

Grocery stores frequently need to move large quantities of ice from a freezer or an ice-making machine located in a storage area to display cases located some distance away within the store. In addition, restaurants, cafeterias, and other institutional food servers often wish to move large quantities of ice from a kitchen or storage area to a buffet, salad bar, or serving table located some distance away. Various types of ice carts have long been used for this purpose.

One difficulty associated with using conventional ice carts arises from the lack of standardization in the height of various types of serving tables. Ice can be most easily transported from the ice cart to a serving table when the ice in the cart is at roughly the same elevation as the display case or serving table. Therefore, the elevation of the ice cart should be adjustable to accommodate the height of the display case or serving table.

Another difficulty arises from the height of the walls of most ice hoppers, which is necessary to provide large carrying capacity. As the ice is gradually emptied from the hopper, the walls of the hopper become an obstruction. The user must lift each remaining scoop of ice up and over the wall of the hopper before it can be deposited on the display case or serving table. This is largely wasted effort and runs a greater risk of spillage. The user should be able to adjustably tilt the ice hopper so that the edge of the hopper is roughly level with the edge of the display case or serving table, so that ice can be scooped directly from the hopper to the display case or serving table with minimal lifting.

A number of carts and containers have used in the past in a wide variety of other fields, including the following:

| Inventor | Patent No. | Issue Date |
| --- | --- | --- |
| Clark | 603,676 | May 10, 1898 |
| Aubrey | 2,001,008 | May 14, 1935 |
| Ingham | 2,903,219 | Sep. 8, 1959 |
| Bruer et al. | 3,685,674 | Aug. 22, 1972 |
| Wagenblast et al. | 3,756,442 | Sept. 4, 1973 |
| Zuber | 3,863,985 | Feb. 4, 1975 |
| Schmook | 4,561,822 | Dec. 31, 1985 |
| Jones | 4,802,709 | Feb. 7, 1989 |
| Gunn | 4,802,810 | Feb. 7, 1989 |

Zuber discloses an offal cart that includes both scissors linkages to raise the tray 59 and means to tip the tray, as depicted in FIG. 1. A hydraulic cylinder 43 driven by water pressure from an external source is used to raise the tray.

Gunn discloses an apparatus that also uses two scissors linkages 42 to raise a container 2, as shown most clearly in FIG. 6. The entire device pivots about a hinge 32 in response to force exerted by a number of piston/cylinder assemblies 34.

The patents to Bruer et al. and Wagenblast et al. disclose other examples using scissors linkages to elevate a container, but require the entire vehicle to be tipped in a manner similar to a wheelbarrow in order to unload the container. The patents to Jones, Schmook, Clark, Aubrey, and Ingham show various ways of tilting or rotating a container, but do not provide a means for elevating the container.

3. Solution to the Problem

None of the prior art references uncovered in the search show an ice cart that provides both means for adjustably elevating the hopper to match the height of the display case or serving table, and means for adjustably tilting the ice hopper.

SUMMARY OF THE INVENTION

This invention provides a portable ice cart offering both elevation adjustment and tilt adjustment for the ice hopper. The ice cart includes a support frame that allows the ice hopper to be tilted to any of a plurality of orientations about a horizontal axis, and a scissors linkage for supporting the support frame at an adjustable elevation above the base of the cart. A retractable spring-loaded pin is used to lock the ice hopper in place after the desired orientation has been reached. The elevation of the ice hopper can be raised by pumping a foot pedal that pressurizes a hydraulic cylinder and extends the scissors linkage.

A primary object of the present invention is to provide an ice cart that can be easily adjusted to varying heights.

Another object of the present invention is to provide an ice cart having a hopper that can be readily tilted to a desired orientation and then locked in place.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
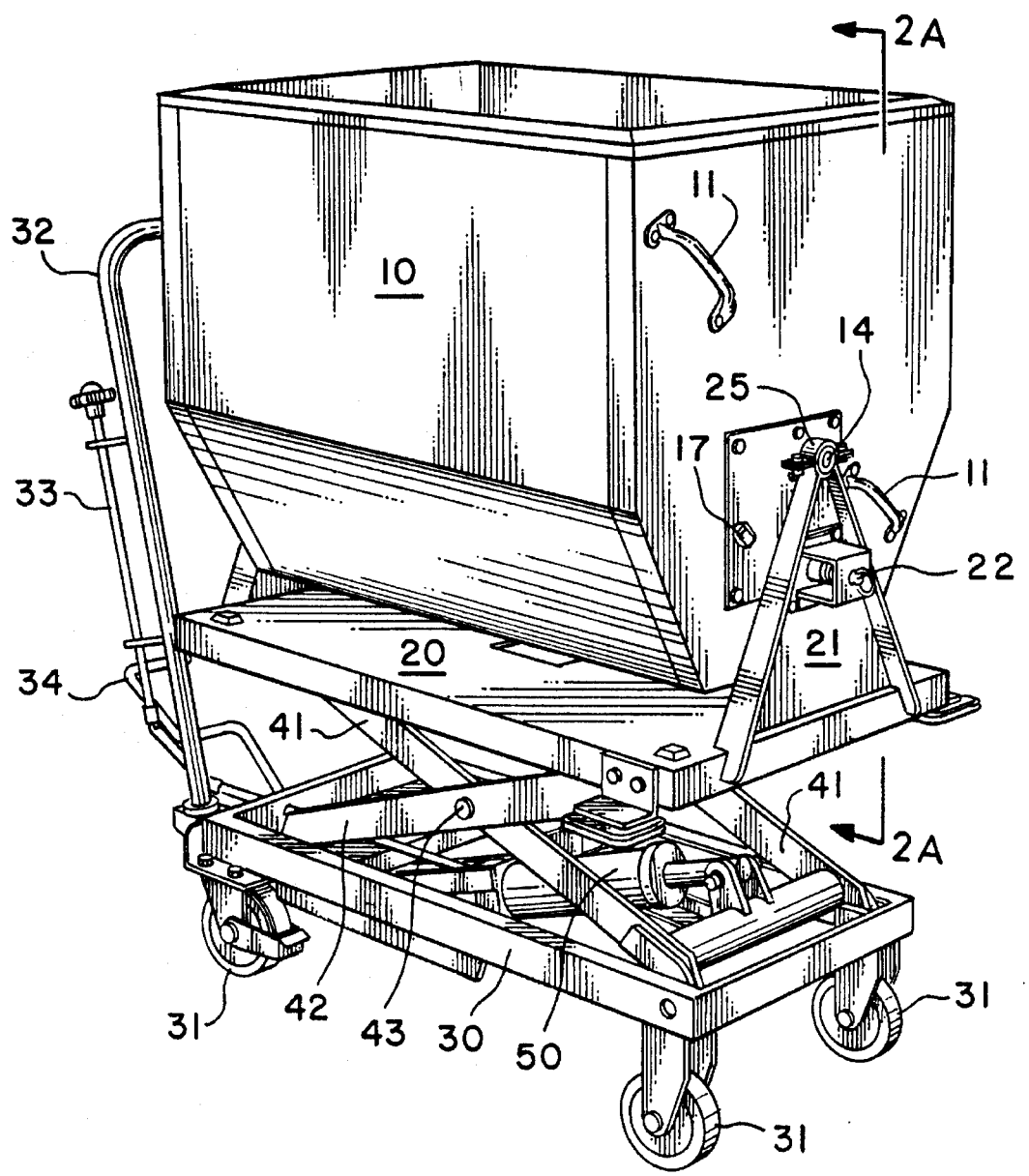
FIG. 1 is a front perspective view of the ice cart.

Turning to FIG. 1, a front perspective view is provided of the ice cart. As a general overview, the major components of the ice cart are a base 30, a support frame 20, an ice hopper 10, and a scissors linkage 41, 42 used to adjust the elevation of the support frame 20 and ice hopper 10 above the base 30.

The ice hopper 10 is generally rectangular in shape with deep side and end walls to hold a substantial quantity of ice. The hopper has an inner surface and an outer surface made of stainless steel with a layer of thermal insulation 12 sandwiched between to minimize melting of the ice. The thermal insulation 12 is shown most clearly in the cross-sectional view of the ice hopper wall illustrated in FIGS. 4A and 4B. A drain valve can also be included in the bottom of the hopper to allow liquid water to be drained from the hopper as the ice melts. Several handles 11 can also be provided on the exterior of the ice hopper 10 to facilitate manual control of the ice hopper.

The ice hopper 10 is supported by the support frame 20. In particular, two horizontal shafts 14 extend from the front and rear walls of the ice hopper 10 along a predetermined horizontal axis. Two corresponding supports 21 extend upwardly at the front and rear ends of the support frame and carry bearings 25 to receive the horizontal shafts 14 extending from the ice hopper 10. The bearings permit the ice hopper to freely tilt or pivot about the horizontal axis.

Figure 2C:
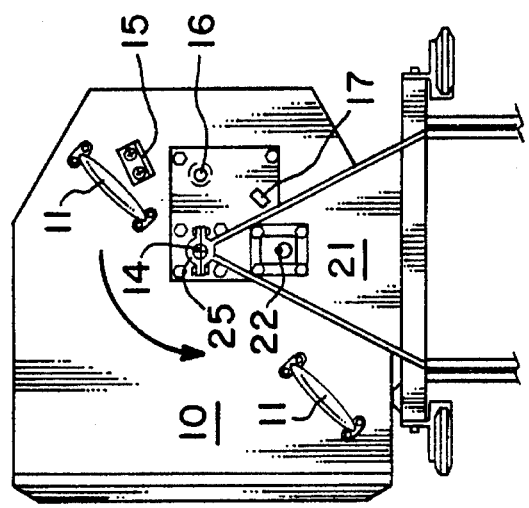
FIG. 2C is a front view of the upper portion of the ice cart with the ice hopper tilted to a horizontal orientation.
Figure 2B:
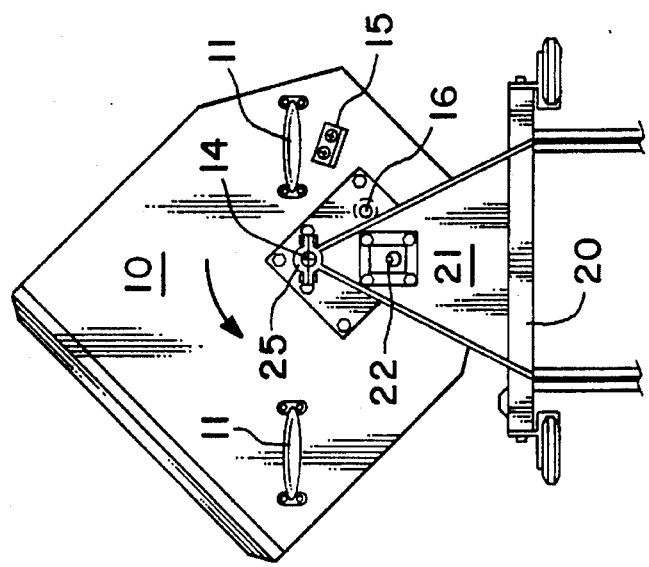
FIG. 2B is a front view of the upper portion of the ice cart with the ice hopper tilted to a 45-degree angle.
Figure 2A:
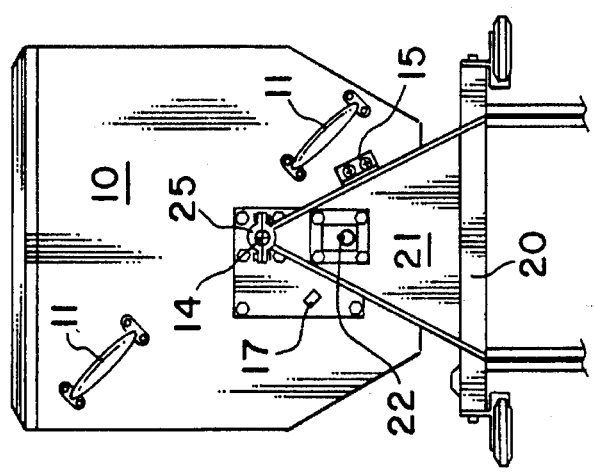
FIG. 2A is a front view of the upper portion of the ice cart with the ice hopper in a vertical orientation.

The orientation of the ice hopper 10 can be manually adjusted within a wide range of angles. For example, FIG. 2A is a front view of the upper portion of the ice cart with the ice hopper in a vertical orientation. A corresponding view with the ice hopper tilted to a 45-degree angle is illustrated in FIG. 2B. The ice hopper is tilted to a horizontal orientation in FIG. 2C. Once the ice hopper has been tilted to the desired orientation, the hopper can be held in place by a locking mechanism while ice is dispensed from the hopper. This locking mechanism can take any of a wide variety of forms. For example, in the preferred embodiment of the present invention, a stop bracket 15 is attached to the ice hopper 10 to help maintain the hopper in a vertical orientation by default (e.g., while the ice cart is in motion).

Figure 3:
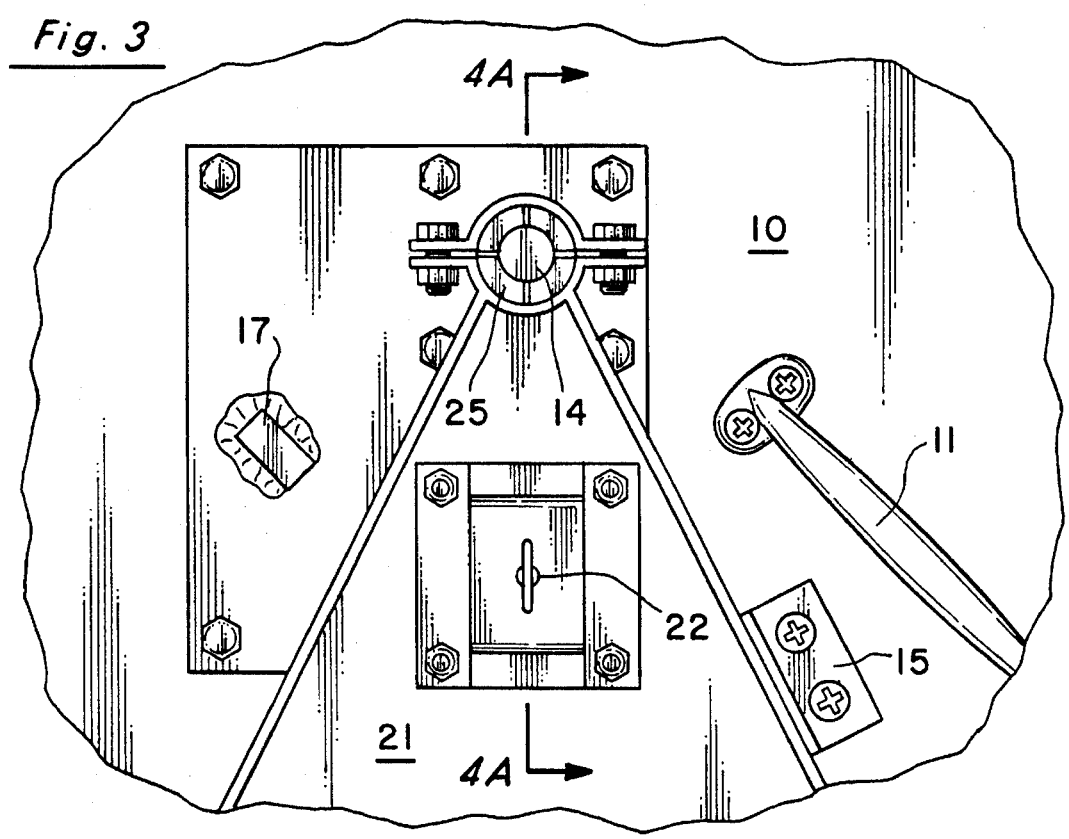
FIG. 3 is a fragmentary front view of the upper portion of the support frame, the shaft and bear assembly used to support the ice hopper, and the locking mechanism used to adjust the orientation of the ice hopper. The ice hopper is shown in its upright or vertical orientation.
Figure 4A:
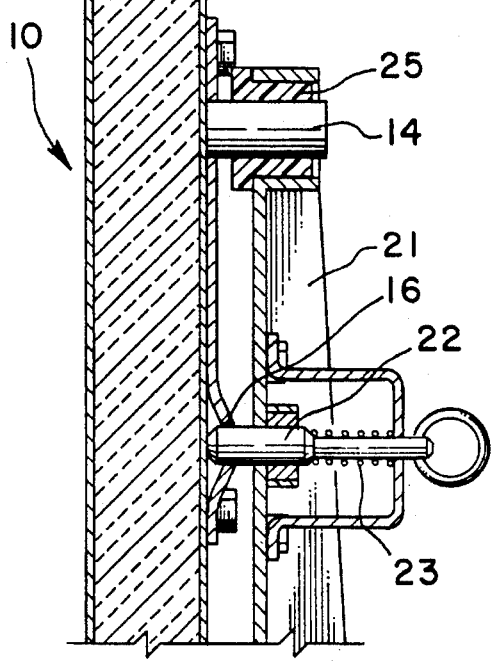
FIG. 4A is a side cross-sectional view corresponding to FIG. 3 with the locking pin 22 seated in the hole 16.
Figure 4B:
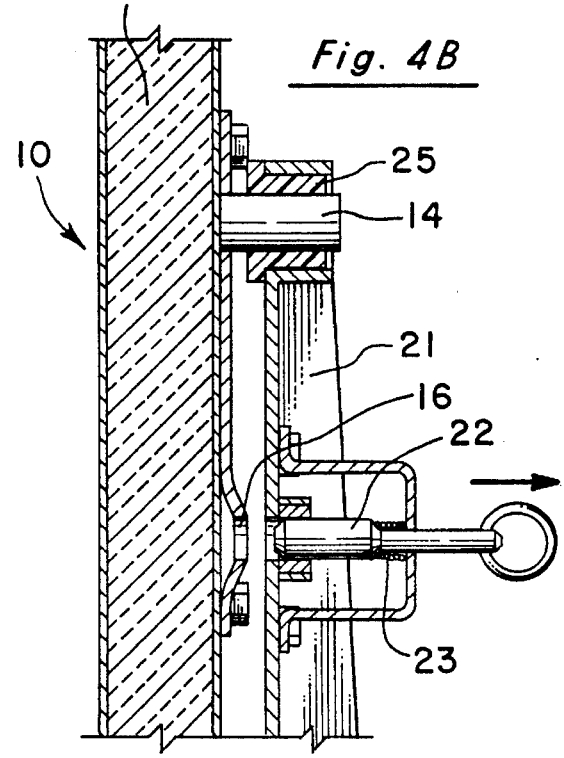
FIG. 4B is another side cross-sectional view corresponding to FIG. 3 showing the locking pin 22 retracted from the hole 16.
Figure 5:
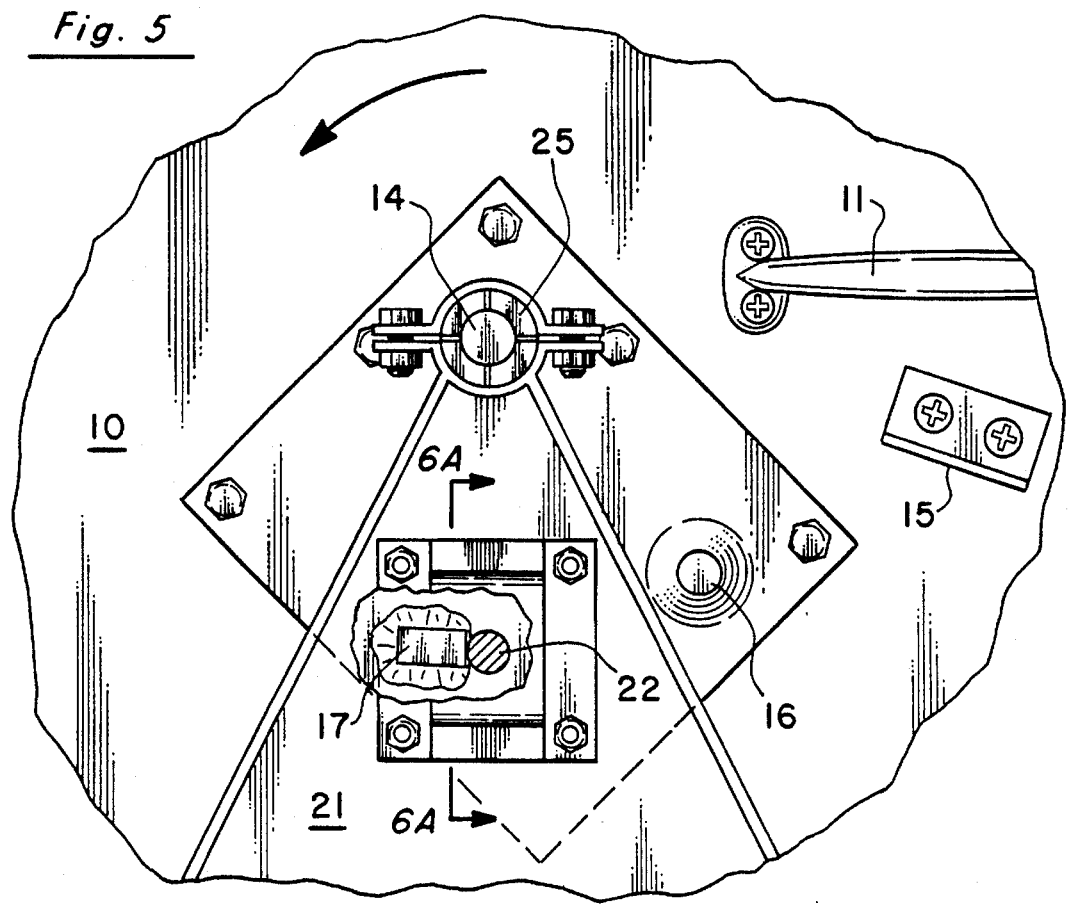
FIG. 5 is a fragmentary front view of the upper portion of the support frame, the shaft and bear assembly used to support the ice hopper, and the locking mechanism used to adjust the orientation of the ice hopper. The ice hopper is shown tilted to a 45-degree orientation. A portion of the bracket supporting the locking pin 22 has been removed to reveal contact between the locking pin 22 and a raised stop 17 attached to the ice hopper 10.
Figure 6A:
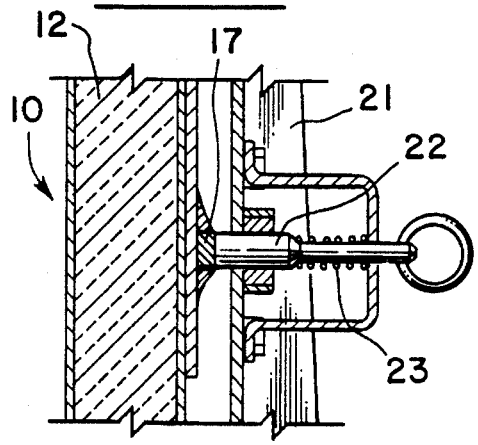
FIG. 6A is a side cross-sectional view corresponding to FIG. 5.
Figure 6B:
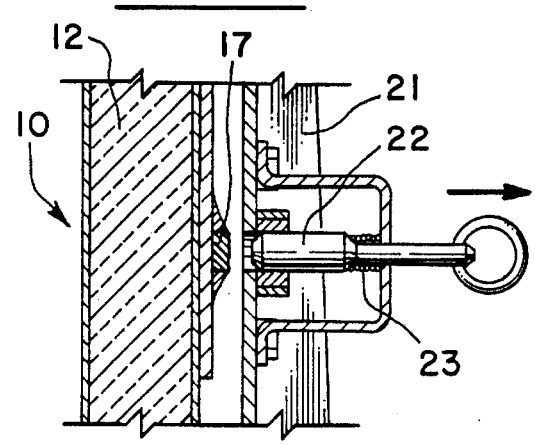
FIG. 6B is another side cross-sectional view similar to FIG. 6A showing the locking pin 22 retracted from engagement with the raised stop 17.

A retractable locking pin 22 is also used to hold the hopper in any of number of possible orientations. A spring 23 exerts a biasing force that tends to press the end of the locking pin 22 against the ice hopper 10. A plurality of stops 16, 17 are arranged on the end wall of the ice hopper 10 in a radial pattern about the horizontal axis to engage the locking pin 22. These stops can take the form of either holes, indentations, raised ridges, or protrusions that engage the locking pin 22 when it is not retracted. FIG. 3 is a fragmentary front view of the upper portion of the support frame and locking mechanism showing the hopper in its upright or vertical orientation. FIG. 4A is a corresponding side cross-sectional view showing the locking pin 22 seated in a hole or indentation 16 in the wall of the hopper 10. FIG. 4B shows the locking pin 22 retracted from the hole 16. A second raised stop 17 contacts the locking pin 22 when the hopper is tilted to a 45-degree angle. FIG. 5 is a fragmentary front view of the upper portion of the support frame and the locking mechanism with the ice hopper 10 tilted to a 45-degree orientation. A portion of the bracket supporting the locking pin 22 has been removed to reveal contact between the locking pin 22 and the raised stop 17 due to the biasing force provided by the spring 23. FIG. 6A is a corresponding side cross-sectional view. FIG. 6B shows the locking pin 22 after it has been manually retracted from engagement with the raised stop 17 to permit the hopper 10 to be tilted beyond a 45-degree orientation.

Figure 7A:
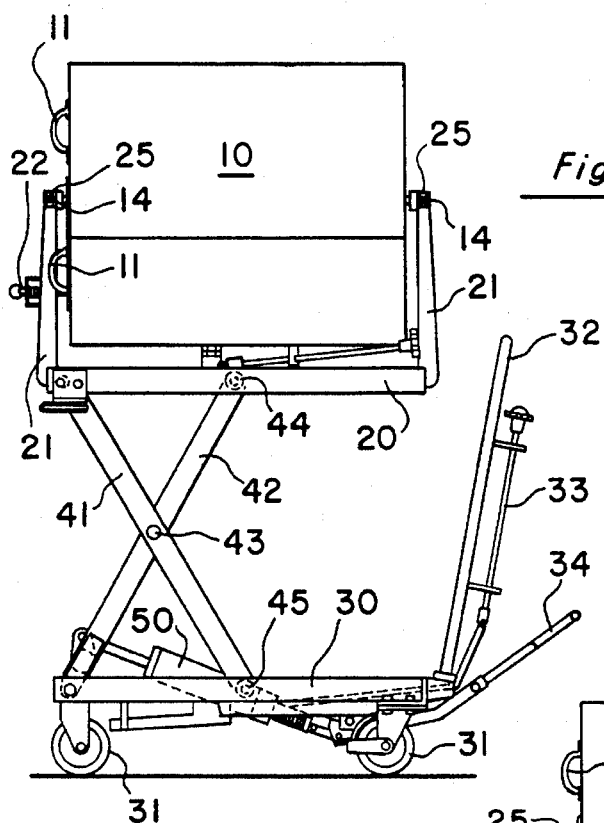
FIG. 7A is side view of the ice cart with the scissors linkage extended to provide maximum elevation for the ice hopper.
Figure 7C:
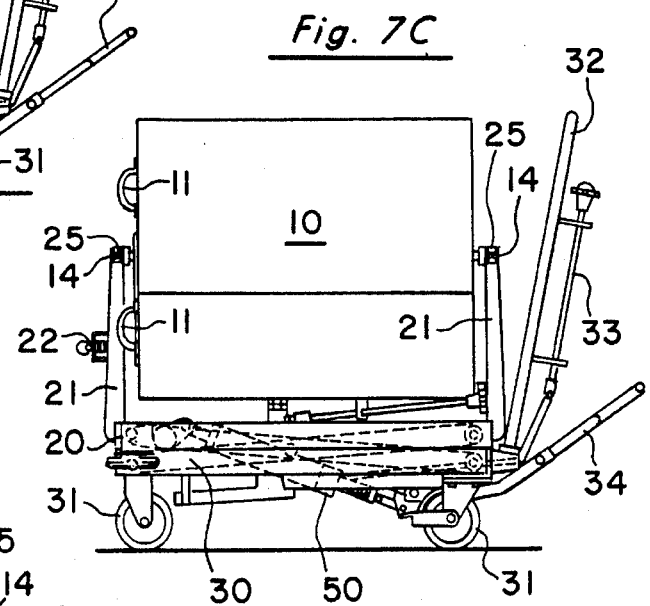
FIG. 7C is a side view of the ice cart with the scissors linkage retracted to provide minimum elevation for the ice hopper.
Figure 7B:
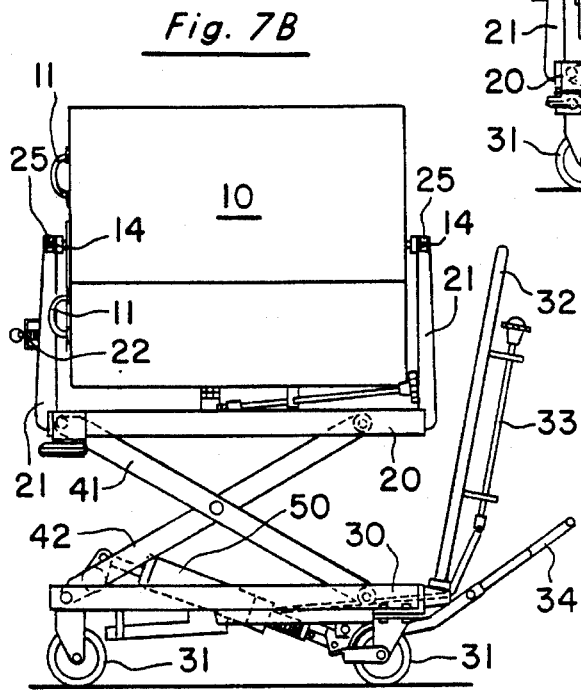
FIG. 7B is a side view of the ice cart with the scissors linkage in an intermediate position.

The elevation of the ice hopper 10 is adjustably controlled by a scissors linkage 41, 42 extending between the base 30 and support frame 20 of the ice cart. FIG. 7A is side view of the ice cart with the scissors linkage extended to provide maximum elevation for the ice hopper 10. FIG. 7B is a corresponding view with the scissors linkage in an intermediate position, and FIG. 7C shows the scissors linkage retracted to provide minimum elevation for the ice hopper 10.

The scissors linkage includes a first arm 41 and a second arm 42 that are rotatably connected together about a fulcrum 43. In the preferred embodiment, the scissors linkage consists of at least two sets of parallel arms located on opposite sides of the cart as shown in the figures. A cross piece extends between the sets of arms along the axis of the fulcrum. The upper end of the first arm 41 is pivotably attached to the support frame 20 without sliding. Similarly, the lower end of the second arm 42 pivotably attached to the base 30 without sliding. Small wheels 44 and 45 are attached to the upper end of the second arm 42 and the lower end of the first arm 41, respectively, as is shown most clearly in FIG. 7A. These wheels rotate and enable the ends of the scissors linkage to freely translate along corresponding horizontal tracks in the base 30 and support frame 20 as the scissors linkage is extended and retracted (see FIGS. 7A through 7C).

Figure 8:
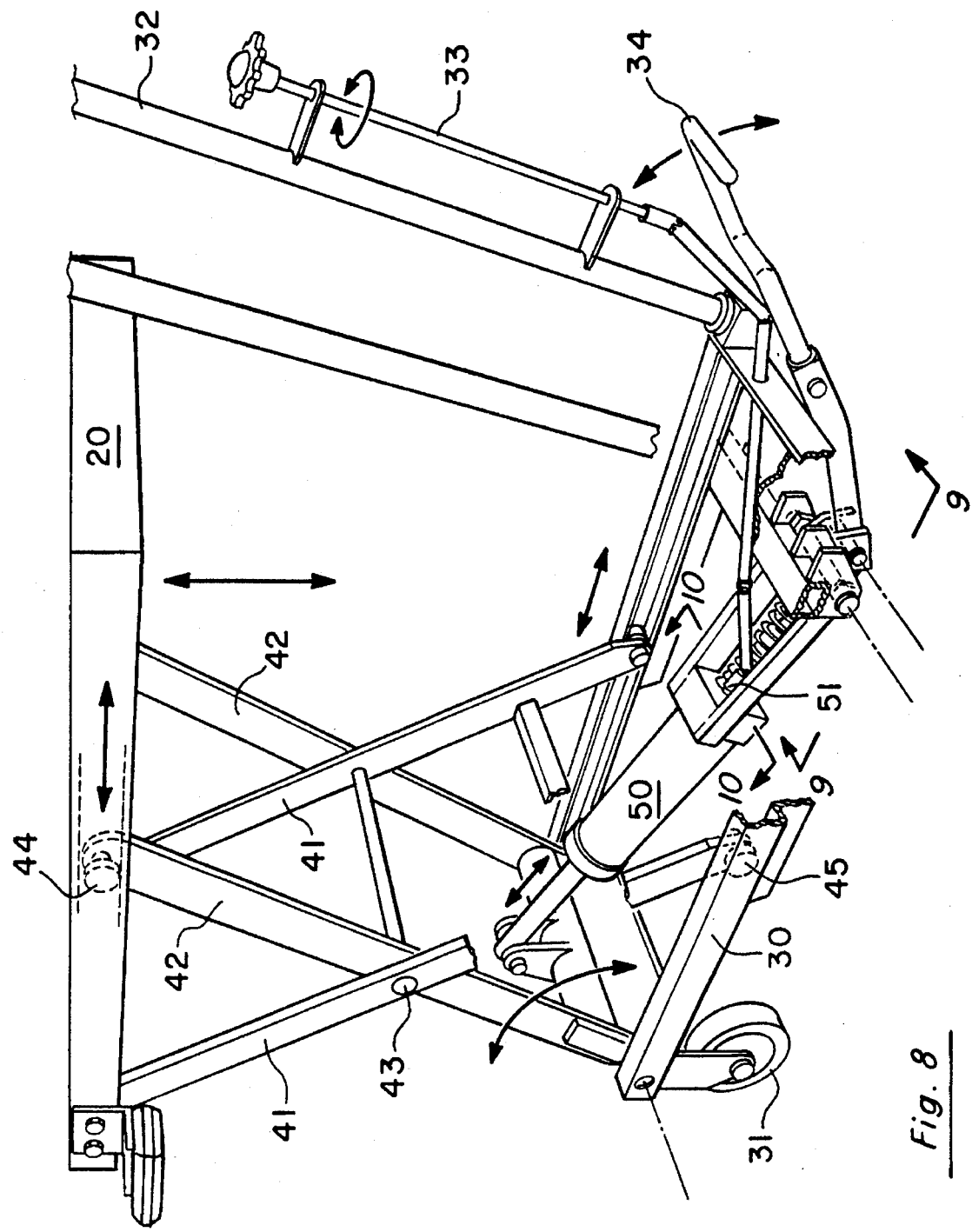
FIG. 8 is a fragmentary perspective view of a portion of the scissors linkage and hydraulic components used raise and lower the ice hopper.
Figure 9:
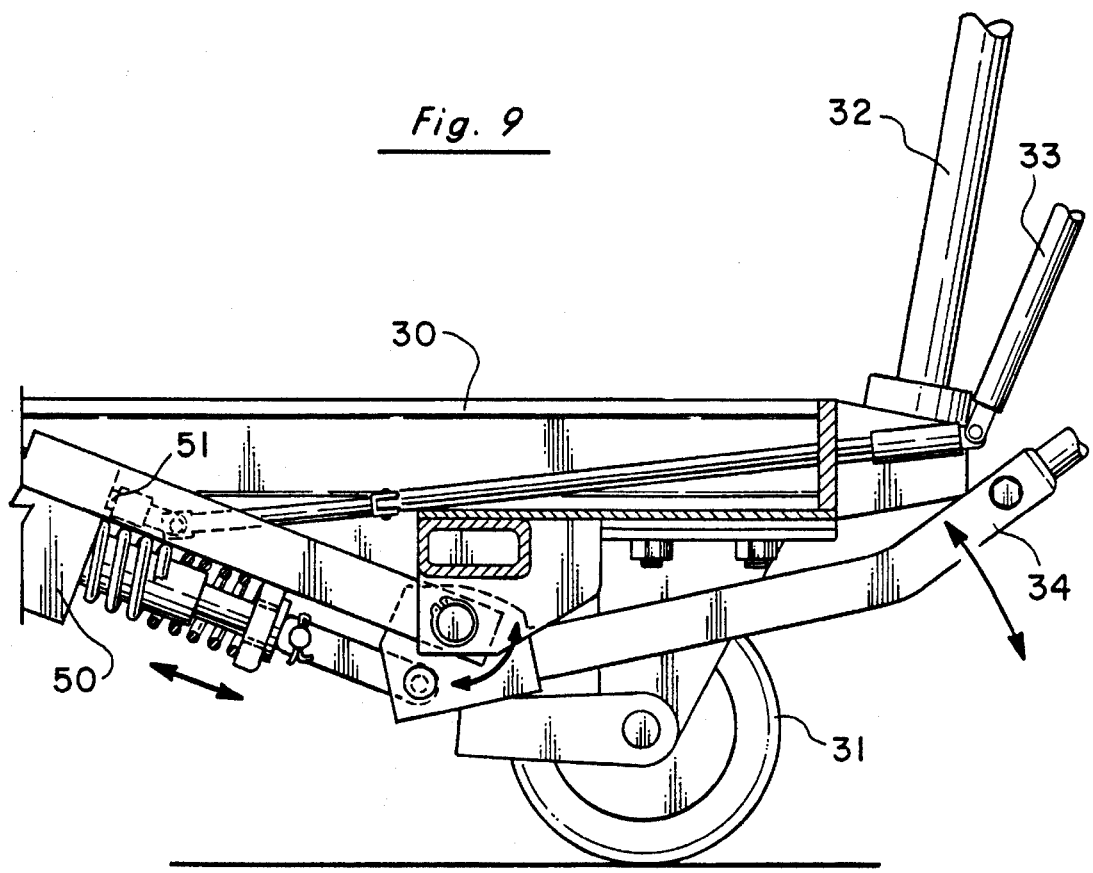
FIG. 9 is a fragmentary side cross-sectional view of the lower rear portion of the ice cart showing the linkages used to pressurize and release pressure from the hydraulic cylinder.
Figure 10:
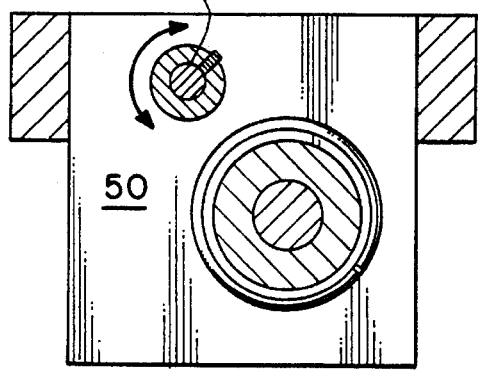
FIG. 10 is a fragmentary cross-sectional view of the lower end of the hydraulic cylinder showing the pressure release valve 51.

The position of the scissors linkages is controlled by a hydraulic cylinder 50 as shown in FIG. 8. FIG. 9 is a fragmentary side cross-sectional view of the lower rear portion of the ice cart showing the linkages used to pressurize and release pressure from the hydraulic cylinder used to raise and lower the ice hopper. A foot pedal 34 can be used to pressurize the hydraulic cylinder 50 to raise the scissors linkage 41, 42. The scissors linkage is lowered by turning a pressure release control lever 33 to actuate a pressure release valve 51 (shown in FIGS. 9 and 10) which releases pressure from the hydraulic cylinder 50.

The ice cart can also be equipped with a number of additional features. For example, the base 30 can be provided with a number of wheels 31 to make the ice cart easier to transport. A wheel brake shown in FIG. 1 prevents the cart from moving while ice is being loaded or unloaded. A pusher bar 32 extending upward from the base 30 allows the user to push directly on the base 30. This eliminates possible inadvertent deflection of the scissors linkage or the tilting mechanism due to the forces exerted in manually pushing or turning the ice cart. The pusher bar 32 also affords the user greater control when pushing and turning the ice cart.

The above disclosure sets forth a number of embodiments of the present invention. Other arrangements or embodiments, not precisely set forth, could be practiced under the teachings of the present invention and as set forth in the following claims.

We claim:

1. An ice cart comprising:

a base;

a support frame;

a scissors linkage for supporting said support frame at an adjustable elevation above said base;

an hydraulic cylinder extending between said base and said scissors linkage for adjustably controlling the elevation of said scissors linkage;

a foot pedal for pressurizing said hydraulic cylinder to raise said scissors linkage;

an ice hopper pivotably attached to said support frame for rotation about a predetermined horizontal axis; and locking means for selectably holding said ice hopper in any of a plurality of orientations about said axis.

2. The ice cart of claim 1, further comprising a valve for releasing pressure from said hydraulic cylinder to lower said scissors linkage.

3. The ice cart of claim 1, wherein said locking means comprise a plurality of stops arranged about said horizontal axis on said ice hopper and a retractable pin extending from said support frame for engaging said stops on said ice hopper.

4. The ice cart of claim 3, further comprising a spring for exerting a biasing force on said locking pin toward said ice hopper.

5. An ice cart comprising:

a base;

a support frame;

a scissors linkage extending between said base and support frame for adjustably controlling the elevation of said support frame above said base;

an hydraulic cylinder extending between said base and said scissors linkage for adjustably controlling the elevation of said scissors linkage;

a foot pedal for pressurizing said hydraulic cylinder to raise said scissors linkage;

an ice hopper pivotably attached to said support frame for rotation about a predetermined horizontal axis;

a plurality of stops arranged about said horizontal axis on said ice hopper; and a retractable pin extending from said support frame for holding said ice hopper in any of a plurality of orientations about said axis by selectably engaging one of said stops on said ice hopper.

6. The ice cart of claim 5, further comprising a valve for releasing pressure from said hydraulic cylinder to lower said scissors linkage.

7. The ice cart of claim 5, further comprising a spring for exerting a biasing force on said locking pin toward said ice hopper.

8. An ice cart comprising:

a base;

a support frame;

a scissors linkage for supporting said support frame at an adjustable elevation above said base;

an hydraulic cylinder extending between said base and said scissor linkage for adjustably controlling the elevation of said scissors linkage;

a foot pedal for pressurizing said hydraulic cylinder to raise said scissors linkage;

a valve for releasing pressure from said hydraulic cylinder to lower said scissors linkage;

an ice hopper pivotably attached to said support frame for rotation about a predetermined horizontal axis; and locking means for selectably holding said ice hopper in any of a plurality of orientations about said axis.

9. The ice cart of claim 8, wherein said locking means comprise a plurality of stops arranged about said horizontal axis on said ice hopper and a retractable locking pin extending from said support frame for engaging said stops on said ice hopper.

10. The ice cart of claim 9, further comprising a spring for exerting a biasing force on said locking pin toward said ice hopper.

\* \* \* \* \*